United States Patent Office 3,545,916
Patented Dec. 8, 1970

3,545,916
PROCESS FOR INHIBITING SULPHUR DEPOSITS IN NATURAL GAS WELL RISERS
Oskar Deicher, Ehlershausen, Siegfried Peter, Hannover-Buchholz, and Otto Buchholz, Aligse, Germany, assignors to Gewerkschaft Elwerath, Hannover, Germany
No Drawing. Filed Oct. 2, 1967, Ser. No. 672,019
Claims priority, application Germany, Dec. 27, 1966, G 48,859
Int. Cl. B01d 47/00
U.S. Cl. 23—2       13 Claims

ABSTRACT OF THE DISCLOSURE

Sulphur deposits in natural gas well risers from gases containing hydrogen sulfide and dissolved elementary sulphur are prevented by adding to the rising gas stream an aqueous solution of an organic base in an amount sufficient to completely dissolve the entrained sulphur and then separating the solution from the gas.

An example of a suitable organic base is ethylamine. The ethylamine polysulfide solution thus formed may be decomposed later by distillation or by stripping of the solution with air or gas.

BACKGROUND OF THE INVENTION

Natural gas wells frequently contain substantial amounts, very often above 1%, of hydrogen sulfide. Hydrogen sulfide containing gases can dissolve substantial amounts of elementary sulphur at presures of a few hundred atmospheres at elevated temperatures. The amount of sulphur dissolved generally exceeds 0.1 gram per normal cubic meter. This phenomenon has been investigated in detail by H. T. Kennedy and D. R. Wieland in Petroleum Transactions, A.I.E.M. 219,166 (1960). It was found in this investigation that the solubility of the elementary sulphur in the gas phase increases with increasing contents of hydrogen sulfide content, temperature and pressure.

It is also well known than an increase of the content of carbon dioxide results in a higher solubility of sulphur in the gas.

The invention applies particularly to natural gases containing substantial amounts of sulphur, hydrogen sulphur and carbon dioxide. The rising gas passes through rock formations which are at lower temperatures and therefore the gases undergo a cooling off process. Because of this cooling off process the solubility decreases and the disolved sulphur precipitates and the deposits at the pipe walls cause clogging up of the system. A particularly massive and sticky sulphur deposit occurs at higher temperatures slightly below the melting point of the sulphur.

It has already been proposed to add to the rising gas an aqueous alkaline solution at a suitable depth for instance at the head of the gas deposit in order to dissolve the sulphur. The alkaline solution reacts with the hydrogen sulfide of the gas upon formation of alkaline sulfide. The elementary sulphur present in the gaseous phase can be dissolved then by means of these aqueous alkali sulfide solutions upon formation of alkali polysulfide. Thus, polysulfides with varying sulphur contents are formed derived from the particular polyhydrogen sulfides such as $H_2S_2$, $H_2S_3$, $H_2S_4$, $H_2S_5$, etc. The solution is then entrained into the gas flow either in form of droplets or in batches and can be separated above ground by a separator.

The gas stream almost always contains carbon dioxide associated with the hydrogen sulfide. This carbon dioxide likewise dissolves in the alkali solution upon formation of carbonates. The amount of carbon dioxide in the natural gas usually is between 0.5 and 40% or more and very often it is higher than 40%. The addition of the alkaline solution to the natural gas flow increases the formation of bicarbonates considerably since the polyhydrogen sulfides, although of a higher acidity than hydrogen sulfide, at low temperatures, have a lower acidity than carbonic acid. The additive most suitable in the prior art proceedings has been alkaline ammonia. However in this case there is the danger that a deposit of the bicarbonate is formed at low temperatures, particularly in winter, in the blind spots of the apparatus. This occurs even at a fairly low carbon dioxide content and at relatively small ammonia concentration. The phenomenon is highly undesirable and can proceed to an extent that the entire operation comes to a stop. Therefore, the highest possible concentration of alkaline in the solution that is added to the gas is practically limited by the solubility of the bicarbonate involved.

SUMMARY OF THE INVENTION

It is therefore an object of the invention to inhibit sulphur deposits in the risers of natural gas wells which avoids the formation of bicarbonates, in particular, the deposits of bicarbonates.

It is furthermore an object to provide for an improved process of sulphur removal operating at improved speeds of solution of the elementary sulphur and providing for a good rate of regeneration of the solvent used. It is also within the contemplation of the invention to permit the reuse in general of the added agents in an economical way for whatever purpose desired.

These objects are met by adding to the rising gas stream an aqueous solution of an organic base in an amount sufficient to completely dissolve the entrained sulphur and then separating the solution from the gas.

DETAILED DESCRIPTION OF THE PREFERRED EMBODIMENTS

The preferred form of the aqueous solution of a watery base is an aqueous solution of an alkylamine. Other water-miscible organic bases may also be used as will be set out presently. Preferably, the solution should be added at the head of the gas deposit.

Examples of suitable bases are: methylamine, dimethylamine, trimethylamine, ethylamine, diethylamine, triethylamine, methylethylamine, dimethyl-ethylamine, diethyl-methylamine, n-propylamine, di-n-propylamine, iso-propylamine, di-iso-propylamine, n-butylamine, n-butyl-methylamine, iso-butylamine, sec.-butylamine, tert.-butylamine, n-amylamine, iso-amylamine, tert.-amylamine, 2-aminopentane.

Other nitrogen attached aliphatic hydrocarbon residues which have a boiling point at atmospheric pressure at about or below 100° C., may also be used.

Regarding aromatic compounds, the following are examples of useful bases: pyrroline, pyrrolidine, pyridine, pyrimidine, pyrazine, piperidine. Other aromatic bases may also be used provided they have a boiling point at atmospheric pressure near or below 100° C.

These organic bases do not form solid carbonates or bicarbonates with carbonic acid or hydrogen sulfide even at higher concentrations nor do they form sulfides or hydrogen sulfides. The aqueous solutions of these organic bases can therefore be added at high concentration to the gas without apprehension regarding the formation of undesirable salts.

The concentration of the organic bases is preferably up to 80%. Particularly in case of the alkylamines a concentration between 5 and 50% is preferred for the reason that commercial products are on the market which contain the alkylamines at this concentration. The aqueous solution of pyridine or pyrrolidine preferably is between 5 and 60%. The amount that is added to the flowing gas can be quite low because solutions with a high contents of alkylamines or other organic bases have a correspondingly high solubility for elementary sulphur. It is preferred to use about twice the amount of alkylamine or organic base as that which would be necessary to form a saturated sulphur solution.

A further advantage of the process of the invention is that the concentrated solutions of organic bases have lower freezing points which facilitates the handling of the solutions above ground during operation in winter time.

The sulphur can be removed from the polysulfide solutions that are separated out from the gas above ground by acidification for instance with hydrogen chloride or with sulphuric acid and subsequent filtration. The volatile alkylamines or similar volatile organic bases also enable the decomposition of the polysulfides through distillation just as with ammonia. The volatile alkylamine or volatile organic base is then blown off and condensed with the escaping steam. The polysulfide-dissolved sulphur separates out.

The distillative decomposition of the polysulfide solutions is preferably carried out at temperatures between 130 and 150° C., where the sulphur separates out in liquid form and can be collected in the bottom of the distillation vessel from which it may be drained from time to time. The water free of sulphur, organic bases such as methylamine or ethylamine, hydrogen sulfide and carbonic acid may be drained from the bottom of the distillation vessel and can be passed to a drainage device.

It was certainly surprising and unexpected that by the process of the invention deposits of solid sulphur on the pipe walls of the risers could be prevented. It is well known that polysulfide solutions are decomposed by acids including carbon dioxide upon separating sulphur. As has been already pointed out polyhydrogen sulfides have a lower acidity than carbonic acid and it was therefore to be expected that polyhydrogen sulfides would first be separated out from the salts of polysulfides formed by the carbonic acid with the alkylamine or other organic base and that these polyhydrogen sulfides would then be subject to decomposition by carbon dioxide. Actually this is what occurs under normal pressures and temperature conditions. However, it appears that the comparatively high pressure prevalant in the natural gas wells and which may be up to 20,000 p.s.i. at the top of the well has the effect of stabilizing the salts of polyhydrogen sulfides with organic bases or of stabilizing also the polyhydrogen sulfides as such.

The solubility for elementary sulphur in gas increases with increasing partial pressure of hydrogen sulfide and $CO_2$. The separation of the sulphur is rather minor if the gas is not saturated with elementary sulphur and depends on the degree of unsaturation or can also be absent completely. However, if there is saturation of sulphur then sulphur separation will be as much higher as the initial concentration is higher, that is, as much higher as the pressure and temperature in the bed are higher. The solubility of the sulphur in the solution of the organic base must be in accord herewith. It was surprising to find that the solubility of sulphur as polysulfide increases in a first stage corresponding to the pressure just as the solubility of sulphur increases in the gas phase. Thus, the amount of solution of organic base which must be added to the flowing gas in order to prevent sulphur deposits remains within economical limits even at high pressures.

The following examples are for illustration of the invention and are not given with any intention to limit the scope thereof.

EXAMPLE I

The issuing gas in this case had the following composition: 14 volume percent of hydrogen sulfide, 8.5 volume percent of carbon dioxide, 4.5 volume percent of nitrogen and 73 volume percent of methane. The temperature in the gas deposit at a depth of about 3,000 meters was 145° C. The gas pressure was 390 atmospheres. The gas deposit contained sufficient elementary sulphur to saturate the gas with sulphur (about 2.5 gram of sulphur per $m.^3_n$ according to Kennedy and Weiland). The gas was fed through a 2⅞ inch feed pipe assembly which formed part of a 7 inch tubing. A 10% solution of ethylamine in water was added to the rising gas at the head of the gas deposit through a parallel duct. The rate of introduction was 500 l./h. at a production rate of the gas of 8,000 $m.^3_n/h$.

In the separator above ground 650 l./h. of a solution containing about 30 grams sulphur per liter was obtained. The ethyl ammonium polysulfide solution was decomposed by distillation or stripping of the solution with air or gas at 140° C. and about 4 atmospheres pressure. The polysulfide dissolved sulphur was separated out in liquid form. The distillate of ethyl ammonium sulfide and ethyl ammonium carbonate and water which was obtained in the decomposition was brought to the desired concentration of 10% by adding fresh water for reintroduction into the circulation.

EXAMPLE II

The issuing gas had the following composition: 3 volume percent of hydrogen sulfide, 40 volume percent of carbon dioxide, 4 volume percent of nitrogen and 51 volume percent of methane. The temperature in the gas deposit at a depth of about 3,000 m. was 145° C. The gas pressure was 390 atm. The gas deposit contained a sufficient amount of elementary sulphur to saturate the gas (about 2 grams sulphur per $m.^3_n$. The gas was fed through a 2⅞ inch feeding pipe assembly contained in a 7 inch protective tubing. A 20% ethylamine solution was fed through a second duct into the gas stream at the head of the gas deposit. The rate of introduction for the ethylamine solution was 1,000 l./h. at a production rate for the gas of 12,000 $m.^3_n/h$. The ethyl ammonium polysulfide solution was then separated out in the separator above ground and contained about 25 grams sulphur per liter. The generation of the polysulfide solution was effected in the same way as in Example I.

EXAMPLE III

Under the same conditions as in Example I, there were added an aqueous solution of 10% methylamine to the gas at the head of the gas deposit. The addition was effected at a rate of 500 l./h. into the rising gas stream of 8,000 $m.^3_n/h$. The aqueous solution which was obtained at about 30° C. in the high pressure separator contained about 30 gram sulphur as methylammonium polysulfide in solution. The regeneration of the separated methylammonium polysulfide solution was effected in the same manner as in Example I.

Instead of methylamine and ethylamine other water miscible alkylamines or organic bases as pyridine, or pyrrolidine etc., may be employed as has already been pointed out.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for inhibiting sulphur deposits in natural gas well risers through which are obtained gases containing hydrogen sulfide and dissolved elementary sulphur, the said process comprising the steps of adding an aqueous solution of an organic base to the rising gas stream in an amount sufficient to completely dissolve the entrained sulphur therein; and then separating the solution from the gas, the said organic base being selected from the group consisting of alkylamines, pyrroline, pyrrolidine, pyridine, pyrimidine, pyrazine and piperidine.

2. The process of claim 1, wherein the aqueous solution of the organic base is added to the gas stream at the head of the gas deposit.

3. The process of claim 1, wherein an aqueous solution of an alkylamine is added to the gas.

4. The process of claim 1, wherein the organic base is water miscible.

5. The process of claim 1, wherein the organic base is added at a concentration up to 80%.

6. The process of claim 1, wherein the alkylamine is added at a concentration between 5 and 50%.

7. The process of claim 1, wherein an aqueous solution of a compound selected from the group consisting of methylamine, dimethylamine and diethylamine is employed.

8. The process of claim 1, wherein the elementary sulphur dissolved as polysulfide is separated out of the solution formed by means of an acid.

9. The process of claim 1, wherein the elementary sulphur which is dissolved as a polysulfide is separated out of the solution formed by distillation.

10. The process of claim 9, wherein the distillation is carried out at an elevated pressure and at a temperature above the melting point of the sulphur.

11. The process of claim 10, wherein the temperature during the distillation is between 130 and 160° C.

12. The process of claim 1, wherein the polysulfide solution formed is decomposed by heating and stripping with a carbonic acid containing gas to effect the precipitation of the sulphur.

13. The process of claim 1, wherein the polysulfide solution formed is decomposed by heating and stripping of the solution with air to effect the precipitation of the sulphur.

References Cited
UNITED STATES PATENTS

| | | | |
|---|---|---|---|
| 2,987,379 | 6/1961 | Urban | 23—225 |
| 3,103,411 | 9/1963 | Fuchs | 23—2 |
| 3,330,620 | 7/1967 | Vian-Ortuno | 23—119 |
| 3,331,657 | 7/1967 | Peter et al. | 23—3 |

E. C. THOMAS, Primary Examiner

U.S. Cl. X.R.

23—225